July 2, 1946.　　　　W. P. LEAR　　　　2,403,091
COMPASS CONTROL SYSTEM
Filed Aug. 12, 1942　　　　2 Sheets-Sheet 1
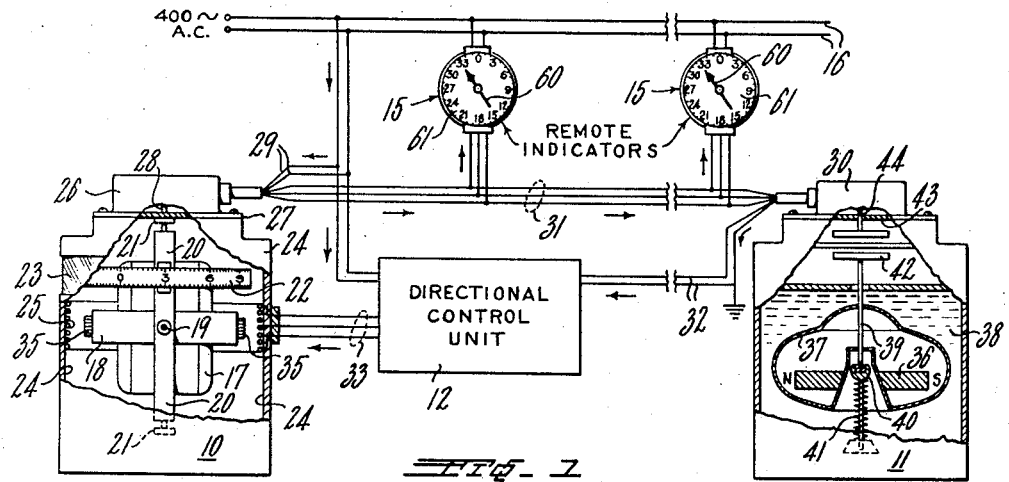
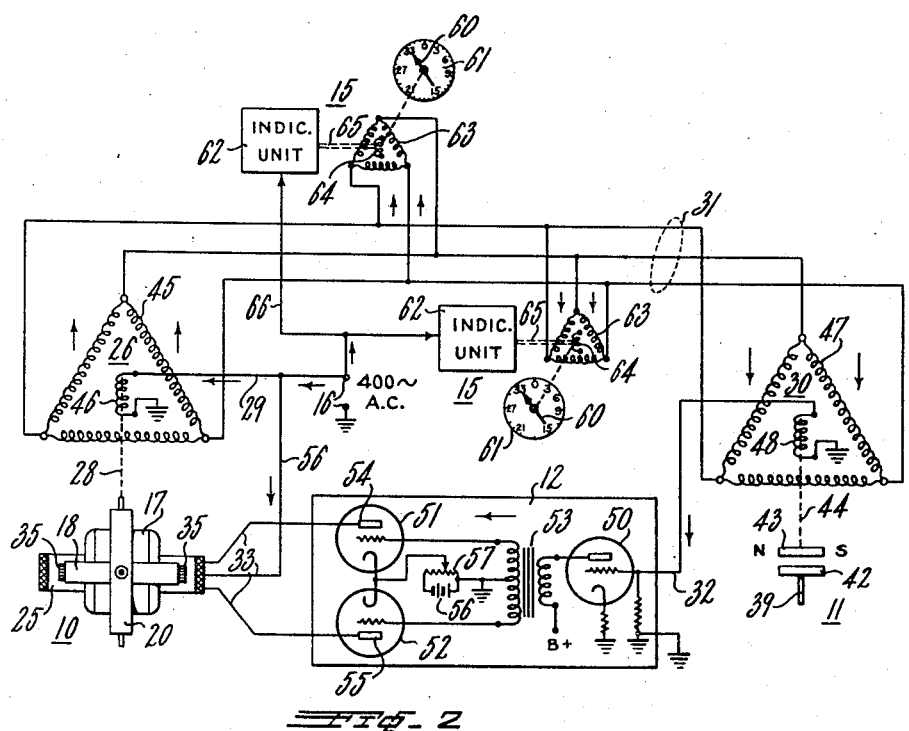
INVENTOR.
WILLIAM P. LEAR
BY Richard A. Maron
ATTORNEY July 2, 1946.  W. P. LEAR  2,403,091
COMPASS CONTROL SYSTEM
Filed Aug. 12, 1942  2 Sheets-Sheet 2
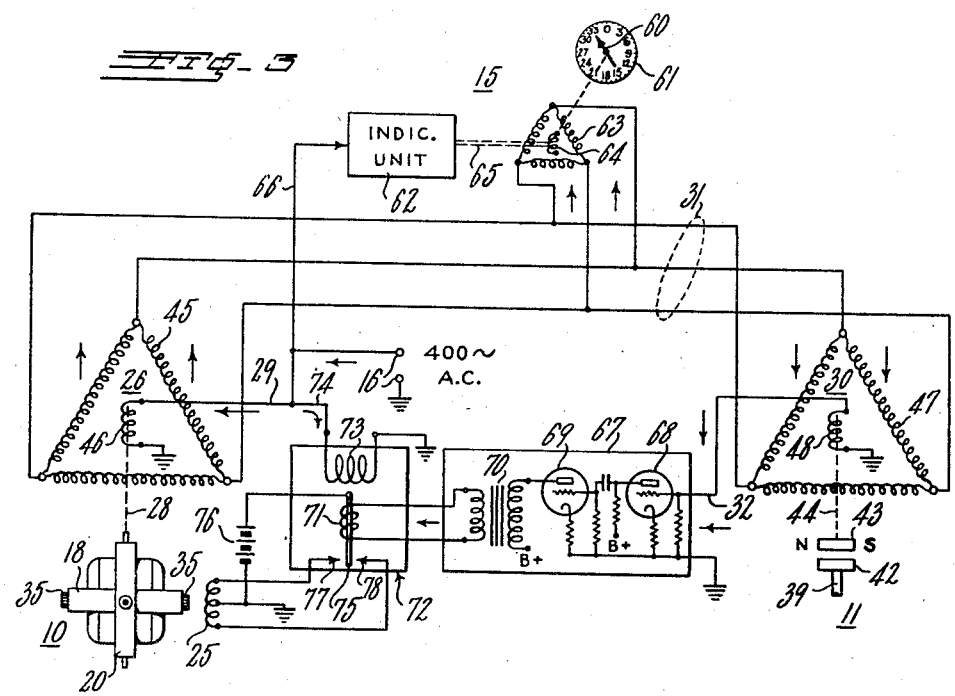
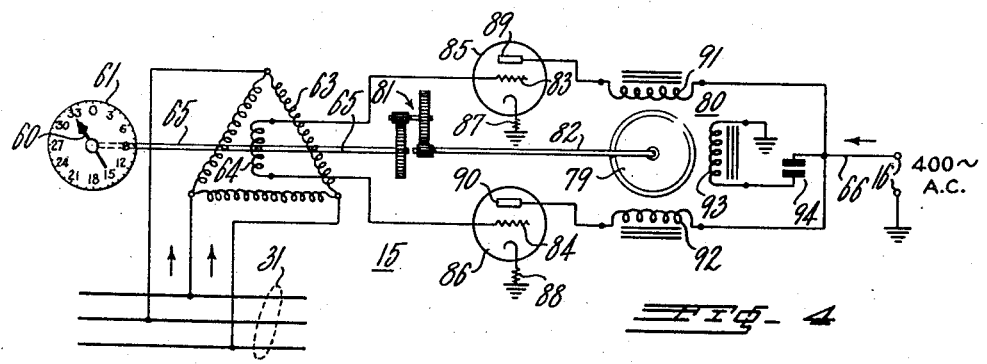
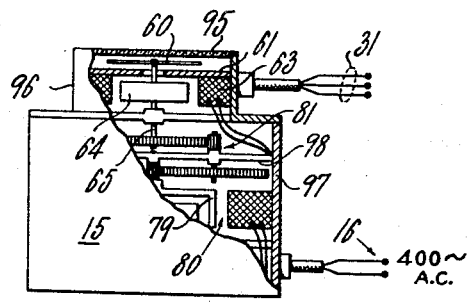
INVENTOR.
WILLIAM P. LEAR
BY
Richard A. Marsen
ATTORNEY Patented July 2, 1946

2,403,091

UNITED STATES PATENT OFFICE 2,403,091

COMPASS CONTROL SYSTEM

William P. Lear, Piqua, Ohio, assignor, by mesne assignments, to Lear, Incorporated, Grand Rapids, Mich., a corporation of Illinois Application August 12, 1942, Serial No. 454,559

12 Claims. (Cl. 33—223)

This invention relates to stable directional compass systems particularly for use aboard aircraft, and self-orienting remote indicators actuated thereby.

In modern armored military aircraft, it is desirable to locate the magnetic compass remote from the instrument panel and pilot so as to avoid indication errors due to the surrounding metallic structure. The compass indications are, furthermore, upset during maneuvering and aerobatics of the aircraft that cause temporary spinning and turning errors in the magnetic compass needle indications. The present invention is directed towards a directional compass system wherein the indications are substantially stable during all aircraft maneuvers. Towards this end a directional gyroscope is electronically related with the magnetic compass in a manner to stabilize the resultant bearing indications. There have been prior attempts to stabilize a directional gyroscope by indications of the magnetic compass. For example, a magnetic element has been incorporated within the directional gyroscope unit. This, however, resulted in a relatively small magnetic compass element, which was not reliable, and which was affected by the aircraft structure.

In accordance with the present invention I provide a simple, reliable and effective stabilized directional compass system. The magnetic compass is merely electrically coupled to the system. A standard compass is employed, which may be placed anywhere on the aircraft so as to be relatively unaffected by the metallic structure and armor. Spinning or turning reactions in the magnetic compass are averaged out in the system and do not erroneously affect the resultant indications. The directional gyroscope is inherently "lazy" and stable over short periods of time, and the composite effect with the magnetic compass is to afford stabilized directional indications that have an overall accurate relationship to true North.

An important feature of the present invention is the substantially torqueless pick-off of both the magnetic and gyroscope compass bearings for effecting the orientation control on the gyroscope. In prior systems errors were introduced in the resultant readings of the system due to the nature and arrangements of the pick-off devices employed. The precessional errors which the directional gyroscope slowly tends to accumulate during flight are continuously and automatically corrected with the magnetic compass as a reference through the intercoupled electronic control unit of the invention. This system may be referred to as a northerly seeking directional gyroscope. Both the magnetic compass and directional gyroscope used are of standard size and conventional design and construction, as are the other components of my system.

Large modern military aircraft generally require a number of remote compass indications throughout the aircraft, so that the co-pilot, navigator, bombardier, and others thereon may have continuous, direct and stable bearing indications. The compass directional systems of the prior art provided only a limited number of remote indicators. An important aspect of the system of my present invention is the provision of any number of remote compass indicators. These indicators are actuated by locally generated electronic control currents. They are selfaligning, and correspond with the direction of the stabilized directional readings. The remote compass indications are substantially unaffected by gyrations to which the magnetic compass may be temporarily subjected, or precessional errors which the directional gyroscope may tend to accumulate. Thus continuous accurate compass bearings are simultaneously provided throughout the aircraft, without loading or otherwise reflecting errors back onto the compass units.

These and further advantages, objects and capabilities of my present invention will become more apparent in the following description of preferred embodiments thereof, shown in the accompanying drawings, in which:

Fig. 1 is a diagrammatic representation of the invention system.

Fig. 2 is a schematic electrical diagram of one embodiment which my invention may assume in practice.

Fig. 3 is a schematic electrical diagram of another embodiment of my invention.

Fig. 4 is a diagrammatic representation of the self-aligning remote indicator arrangement of the invention.

Fig. 5 is a view in elevation, partially in section, of one form which the remote indicator of the invention may assume in practice.

Referring to Fig. 1, it is noted that the essential components of the invention system are the directional gyroscope 10, the magnetic compass 11, the intercoupled electronic directional control unit 12, and the remote indicators 15. The system is energized by a local alternating current source 16 that is generally present aboard the aircraft. A 400 cycle supply is indicated. The directional gyroscope 10 is of the conventional type, comprising a rotor 17 mounted with three degrees of freedom. The gyroscope rotor 17 may be electrically or pneumatically driven, as will be understood by those skilled in the art. Gyro rotor 17 is spun about a horizontal spinning axis supported in gimbal ring 18, which in turn is freely mounted on bearings 19 in vertical ring 20. Vertical ring 20 is rotatably supported about a vertical axis on bearings 21 of the gyroscope. A circular directional scale 22 is supported on vertical ring 20, and viewed through window 23 in gyroscope casing 24.

The gyro indications correspond to the reading of scale 22 opposite the usual index or lubber line marked on window 23. Conventional auxiliary means for driving and caging the gyroscope, not shown, are to be understood as incorporated in the schematically represented directional gyroscope 10. Directional gyroscope 10 is of standard size and design, being additionally provided with a precession correction winding 25 mounted within casing 24. Winding 25 is concentric about horizontal gimbal ring 18. A bearing "pick-off" unit 26 is supported on a plate 27 that is mounted on top of casing 24. Unit 26 comprises a central vertical shaft 28 which is secured to vertical ring 20 of the gyroscope. Practically no torque or force is imparted to the gyroscope by unit 26, as will hereinafter be set forth in more detail. The directional position of the gyroscope is in this manner directly communicated to unit 26.

Unit 26 corresponds to a transmitter component of a self-synchronous type telemetering arrangement, and is energized by the local alternating current source 16 through leads 29. Pick-off unit 26 is interconnected through cable 31 with a corresponding pick-off unit 30 that is coupled to magnetic compass 11. A control signal is derived from the interaction of pick-off units 26 and 30. The control signal is introduced into the directional control unit 12 by leads 32. A unidirectional control current is generated at the output of electronic unit 12, and connected by leads 33 to gyro-precession coil 25. A uni-directional corrective flux is produced by coil 25 that reacts with permanent magnets 35, 35 secured to horizontal gimbal ring 18. The corrective force thus exerted on magnets 35 is in a direction so as to counteract any precessional or turning errors that the gyroscope may tend to incur. In this manner the orientation and indications of the gyroscope are made stable, and 'tied' to the true magnetic north indications of magnetic compass 11.

The magnetic compass 11 is of standard size and the conventional design generally used aboard an aircraft. It is a master magnetic compass, containing a substantial magnetic bar 36 which is mounted for free movement in azimuth for alignment with the earth's magnetic field. Bar magnet 36 is within a float 37 which is pivotally supported within a fluid 38 in the compass 11 housing. A pivot spindle 39 is secured with float 37 and supports the float and magnet bar 36 on a jewel bearing 40. A spring 41 supports bearing 40 and also float 37 in a resilient manner. Magnet 36 is thus freely supported for alignment with the earth's magnetic field, fluid 38 serving to dampen the movements of the magnet as well as relieve the pivot pressure on bearing 40. Prior comparable magnetic compass constructions, including means for directly viewing its readings, and for telemetering its indications, are shown in U. S. Patents Nos. 2,206,506 and 2,242,126.

The directional orientations of magnet 36 are communicated to the inductive electrical pick-off unit 30, as follows. A small magnet 42 is mounted at the upper end of spindle 39. A second magnet 43 is mounted above magnet element 42 and serves as a follow-up or "slave" magnet. Magnet 43 is connected to the rotor of pick-off unit 30 through shaft 44. Thus the azimuthal bearing indications of the main compass bar 36 are faithfully communicated to the rotor of pick-off unit 30. Such action is with the application of negligible drag or torque which might interfere with accurate directional alignment of magnet bar 36. By my system, any number of remote bearing indicators 15 may be incorporated without introducing drag on either of the compasses 10, 11, since the indicators are locally energized and self-aligning, as will be set forth in more detail hereinafter.

Fig. 2 is a schematic electrical diagram of the system corresponding to Fig. 1, and embodying the principles of my present invention. The compass pick-off units 26 and 30 are such as are generally known and used in the art of telemetering. They comprise symmetrical rotor and stator components, interconnected so as to derive a stabilized electrical current and magnetic flux relationship therebetween. The stators are multi-phase wound, e. g. two-phase or three-phase, respectively. The illustrated units 26, 30 have three-phase delta connected stator windings 45, 47 and single-phase rotor windings 46, 48.

Corresponding terminals of the three-phase stators 45 and 47 are interconnected by the three wire cable 31. The local alternating current supply 16, which in modern aircraft is usually at 400 cycles, is connected by lead 29 to the single phase rotor coil 46 of pick-off unit 26. As described in connection with Fig. 1, rotor 46 is mechanically coupled to vertical ring 20 of gyroscope 10 through shaft 28. Rotor winding 48 of pick-off unit 30 is electrically connected by lead 32 to the input of electronic unit 12. Rotor 48 also is mechanically connected by shaft 44 to slave magnet 43 of the magnetic compass 11, as previously described.

The single-phase voltage applied to rotor 46 produces a sinusoidal magnetic field that induces voltages in the three-phase stator winding 45. The relative phase and magnitudes of the voltages induced in the three component branches of stator 45 depends upon the angular position of rotor 46 within the stator. Such angular position of rotor 46 is in turn controlled by the directional orientation of the gyroscope 10 through vertical ring 20. The induced voltages appearing at the terminals of stator 45 are transmitted to the corresponding terminals of stator 47 to produce currents in the windings of stator 47 that correspond with those in winding 45. A magnetic field is thereby set up within stator 47 that is identical in space and time phase relationship with the field within stator 45 as generated by rotor 46. The flux within stator 47 is sinusoidal in time. This flux induces a corresponding sinusoidal voltage in rotor winding 48 of unit 30.

The magnitude and phase of the voltage produced across coil 48 by stator 47 depend upon the angular space phase of coil 48 within stator 47. The induced voltage action is similar to that of a directional loop antenna responsive to a radio signal. The induced voltage is characterized by a figure-of-eight pick-up pattern. The phase of the resultant voltage in coil 48 is in-phase or 180° out-of-phase with the magnetic flux of stator 47. The magnitude of the voltage across rotor 48 is proportional to the sine of the angle which coil 48 makes with its zero pick-up position in the flux in stator 47. The rotor 48 induced voltage is impressed upon the control electrode of electronic amplifier tube 50 in unit 12. The voltage from rotor coil 48 constitutes a control signal for the system. The control signal is amplified in a conventional manner by triode 50, and impressed upon the control electrodes of a push-pull amplifier stage 51, 52 through transformer 53.

Thus, in accordance with my present invention a control signal is provided by the rotor 48, of magnitude that is directly dependent upon the angular difference that exists between bearings of the directional gyroscope 10 and magnetic compass 11, and of phase that is directly dependent upon the sense of the angular difference. The reason is that the space phase of the sinusoidally varying magnetic field within stator 47 depends upon the angular position of gyroscope rotor coil 46 within its stator 45. The space phase of the flux within stator 47 is thus directly controlled by the angular bearing position in azimuth of directional gyroscope 10. On the other hand, the angular position of rotor coil 48 within stator 47 is determined by the angular bearing position of magnet bar 36 of the magnetic compass 11. Accordingly, the sinusoidal voltage impressed upon rotor coil 48 is determined by the spatial angular difference in azimuth existing between the two compasses 10, 11. The larger such angular difference, the greater the magnitude of the induced control voltage from coil 48 impressed upon electronic unit 12.

In practice, the orientation or bearing positions of directional gyroscope 10 are "tied to" or otherwise made to correspond with the azimuthal bearing position of compass 11. In other words, both readings are made to refer to true magnetic north as the reference; the magnetic compass finding such magnetic north, and the directional gyroscope being made to assume and maintain such spatial reference. The magnetic compass bar 36 naturally assumes such north position, or otherwise averages out its gyrations to an effective north position.

The control action of the invention is on the directional gyroscope 10 in a manner such as to bring it in line or tie in with the average magnetic compass north position. Such action is automatic and continuous in the invention system, and accordingly no substantial angular discrepancy can exist between the bearing indications of the compass, nor pull apart the relative spatial positions of rotor coils 46 and 48 for a sufficient length of time to throw the system out of synchronism. For this reason also, the possible 180° pick-up ambiguity of the rotor coil 48 signal cannot in practice interfere with the determined sense relationship that controls the gyroscope precession correction action.

The control voltage at coil 48 will thus in practice be within a practical operating range of values, and its sense determines the direction of the precessional control on gyroscope 10 through coil 25 as follows. The control voltage introduced by lead 32 to electronic control unit 12 is impressed upon the grid electrodes of push-pull tubes 51, 52 in opposed or 180° out-of-phase relationship by push-pull transformer 53. Anodes 54, 55 of tubes 51, 52 are connected to alternating current source 16 by lead 56 through a center tap on precessional control coil 25. Thus the anodes of control tubes 51, 52 have the local reference alternating current voltage continuously impressed thereon in phase.

The control tubes accordingly selectively respond to the control voltage corresponding to the signal from rotor 48. The phase of the control voltage impressed on unit 12 determines which of control tubes 51, 52 is rendered conductive, as will now be understood by those skilled in the art. The in-phase and sinusoidal character of the anode voltage on tubes 51, 52 permits only one of them to conduct in correspondence with the phase of the control voltage applied to their grid electrodes. Thermionic tubes 51, 52 may be vacuum or of the gaseous variety, such as the so-called thyratron or trigger control tubes. The cathodes of the tubes 51, 52 are connected together and are suitably electrically biased by direct current voltage source 56.

A potentiometer 57 across bias voltage source 56 forms a sensitivity control for the precessional correction action. Potentiometer 57 setting determines the relative magnitudes of the resultant uni-directional control current applied to coil 25, dependent upon the control signal magnitudes. The phase of the control signal voltage impressed upon the grid electrodes of either tube 51, 52 is either in-phase or 180° out-of-phase with respect to the reference phase of the local A. C. 16 as applied to the anodes thereof. The control tube wherein both the impressed control voltage and anode voltage are in-phase becomes conductive to produce a corresponding uni-directional current to flow through its associated section of the precession coil 25.

The direction of flow of the control current impressed upon either half of winding 25 is predetermined to react on permanent magnet elements 35, 35, on gyroscope gimbal ring 18, in a manner to counteract or otherwise negative the bearing discrepancy which the gyroscope may tend to assume with respect to the magnetic compass. In other words, any angular discrepancy of the gyroscope which begins to arise due to northerly turning error, precessional error, or the like, causes an angular differential between rotors 46 and 48, which correspondingly produces the control signal at rotor 48 as previously set forth. The phase of the control signal is determined by the sense of such angular discrepancy, which phase is pre-related to the circuital connections of control tubes 51, 52 and the associated precession control coil 25, as well as the physical disposition of magnets 35, 35 on the gyroscope, in an manner to return the gyroscope orientation back to the angular position corresponding to the true magnetic North position of the magnetic compass.

In practice the magnetic compass is more sensitive to aerobatic disturbances due to the aircraft, but its northerly indications average out over a period of time, and in straight flight condition are quite stable. However, the directional gyroscope 10, having three degrees of freedom, is a relatively stable indicator unit over longer periods of time during aerobatics. Its northerly turning or precessional errors are cumulative only over a substantial period of time, a matter of several minutes. The precessional control on the gyroscope through coil 25 is made to be only slowly effective on the gyroscope, so as not to disturb its normally stable readings by temporary spinning or upset conditions of the magnetic compass bar. The sensitivity control of the precession action is adjustable by potentiometer 57, and in practice the overall action is determined by suitable physical design of the system components. It is thus unnecessary to periodically readjust the directional gyroscope 11 for precessional errors, since such are automatically eliminated by reference to and control by the average northerly readings of the magnetic compass 11.

The remote indicator units 15 are electrically connected to the compass system in a manner to avoid interference with the normal bearing indications of both compasses. A magnetic compass is particularly sensitive to torque or load applied to its magnet bar 36 that might interfere with its natural magnetic azimuthal alignment. The invention rotor 48 coupled to magnet compass bar 36 affords negligible drag, particularly since the normal electrical position of coil 48 within its stator 47 is at the zero flux relation where no drag action at all prevails, and also since no torque reaction occurs thereon when it is off the zero flux position. Any number of remote indicator units 15 may be connected to the system, and all will read the stable bearing indication corresponding to that of the compasses.

The indicator needles 60 of all the indicator units 15 assume a spatial relationship corresponding to the spatial orientation of the magnetic compass 11 and the gyroscope 10 controlled thereby; the zero indices of the respective indicator cards 61 corresponding to the lubber lines of the compasses. Their readings are the angular deviation of the longitudinal aircraft axis with respect to the true magnetic north. Indicators 15 are self-orientating, deriving their energization from the local alternating current source 16. Each indicator unit 15 comprises an electronic motor driven component 62, and a stator-rotor unit 63, 64 coupled thereto by a shaft 65. The stator-rotor unit 63, 64 of indicators 15 are similar in design with the corresponding telemetering stator-rotor units 26 and 30 coupled to compasses 10, 11. Three-phase delta wound stators 63 are connected to three-wire cable 31, in correspondence with the connections of the main stator units 26, 30. Control units 62 of indicators 15 are energized from local alternating current source 16, through leads 66. Further details on the construction and operation of the self-orientating indicator units 15 will be described hereinafter in conjunction with Figs. 4 and 5.

Fig. 3 illustrates a modified form which my invention may assume in practice. Directional gyroscope 10, magnetic compass 11, and the associated pick-off units 26, 30 are the same as those of the system of Figs. 1 and 2. The electrical interaction between the pick-off units 26 and 30 for producing the control voltage at the terminals of rotor 48 is also the same. The precessional control action, however, is produced herein by a linear amplifier 67 in conjunction with a dynamometer type relay 72. Connection lead 32 from rotor 48 impresses the control signal voltage upon the control electrode of triode 68 of amplifier 67. Amplifier 67 is shown with two cascaded stages 68, 69 connected in a conventional manner. The sinusoidal control voltage is thus amplified and applied to output transformer 70. Its output is applied to coil 71 of relay 72. The other coil 73 of relay 72 is connected by lead 74 to the local reference alternating current source 16.

Armature 75 of dynamometer relay 72 is connected to a local D. C. voltage source 76, which in turn is connected to the center tap of precession control coil 25. The opposite ends of coil 25 are connected to the relay contacts 77, 78. When a control signal is produced in rotor coil 48, it is thus amplified and applied to coil 71 of relay 72. The sense of the control current at coil 71 with relation to the reference alternating voltage applied to coil 73 determines the direction of displacement of armature 75. The corresponding section of control coil 25 is thereby placed in circuit with battery 76. The circuital arrangement of the coil 25 and the polarity of battery 76 are correlated with the disposition of magnets 35, 35 to counteract or otherwise return the directional gyroscope to its northerly position as determined by magnetic compass 11. When the directional gyroscope and the magnetic compass are both in synchronous azimuthal alignment, rotor 48 will be in the spatial position wherein no signal voltage is induced therein. Relay 72 will thereupon be in its neutral or off position, and no precessional control effected.

The self-orienting remote indicator of the invention, schematically indicated at 15, is diagrammatically illustrated in Fig. 4. The three-phase voltages produced by gyroscope pick-off unit 26 and introduced into three-wire cable 31, are correspondingly impressed upon the three-phase stators 63 of indicators 15 connected therewith. These voltages set up currents in the windings of stator 63, producing a magnetic flux condition within the stator. Such flux corresponds to that resulting in stator 47. The rotor 64 within stator 63 thus has a voltage induced therein of magnitude and phase corresponding to the angular position of rotor 64 with respect to that of gyroscope rotor unit 46. The reasons for this action are the same as hereinbefore described in connection with the signal voltage induced in rotor 48 by stator 47. The sense of the voltage induced in rotor 64 will accordingly be in-phase or 180° out-of-phase with respect to the local alternating current source 16, and of magnitude depending upon the "off-angular" position of the rotor coil 64. The true or "null" angular position of coil 64 will always correspond to the angular position of the directional compass bearings, at which position zero voltage is impressed upon the rotor 64.

Rotor 64 of remote indicator 15 is directly coupled by shaft 65 to indicator pointer 60. Shaft 65 is coupled to the rotor 79 of the control motor 80 by reduction gearing 81 through shaft 82. Indicator control motor 80 is shown of the split-phase or two-phase alternating current type, locally energized by alternating current source 16, and controlled by the voltage signal generated at rotor coil 64 as follows. The terminals of rotor coil 64 are respectively connected to control electrodes 83, 84 of a pair of thermionic tubes 85, 86. Tubes 85, 86 may be contained in a single envelope. The cathodes of tubes 85, 86 are connected to ground through biasing resistors 87, 88. Tubes 85, 86 may, for example, be biased for either class A or class B operation. The anodes 89, 90 of motor control tubes 85, 86 are connected to individual, oppositely phased, stator windings 91, 92 of motor 80. A third winding 93 of motor 80, arranged 90° out of space phase with the windings 91, 92, as in the usual design of a split-phase motor, is connected to the local alternating current source 16 through a substantial starting capacitor 94.

Details of the theory and operation of other self-orienting remote indicators which may be used in the system of my present invention are set forth in my copending application Serial No.

487,074 filed May 15, 1943, now Patent No. 2,346,849, issued April 18, 1944. When pointer 60 is at its proper directional position, a zero signal voltage obtains across the terminals of rotor coil 64, and no current flows through tubes 85, 86 or motor stator windings 91, 92. Motor 80 is accordingly at rest and pointer 60 remains at its proper indicating position. When the angular attitude of the aircraft changes, this moves the casings of directional gyroscope 10 and magnetic compass 11 about their directionally stable elements, which produces a correspondingly changed bearing indication of the compasses with respect to their indices or lubber lines. Similarly, the stators 45 and 47 are rotated about their associated rotor coils 46 and 48, the latter being physically coupled to the spatially oriented compass elements 20 and 36. This action causes a changed distribution in the three-phase voltages within cable 31.

The voltage and magnetic flux redistribution occurs simultaneously at all the stator elements, including stators 45, 47, and stators 63 of each of the remote indicators 15. As this redistribution of the stator voltages and flux occurs, a corresponding voltage is set up within indicator rotor coils 64, the phase of which depends upon the sense of the angular change. The control electrodes 83, 84 of motor control tubes 85, 86 thus have a voltage applied that is pre-related to the fixed reference voltage on their anodes 89, 90 from the local A. C. source 16. This action causes a preponderance of alternating current at the local frequency in one of the two motor stator windings 91, 92. Rotor 79 of motor 80 is accordingly rotated in the direction to cause rotor coil 64 to follow the changing orientation of the stator 63 flux.

The direction of rotation of rotor coil 64 is such that it follows its zero voltage pick-up relation with the surrounding stator flux. Since pointer 60 is connected to rotor coil 64, it is correctly carried to the new angular position which the compasses 10, 11 assume with respect to the aircraft attitude. When a stable compass bearing position is reached, the zero voltage pick-up position prevails, and motor 80 promptly stops. The reduction gearing 81 facilitates precise stoppage, and inhibits hunting. A similar action prevails when a discrepancy arises or tends to arise between the bearing indications of the directional gyroscope 10 with respect to those of the magnetic compass. In the latter instance, the stator winding flux distribution is temporarily oriented to bring both compasses into correspondence, in the manner previously described, and the stator-rotor 63, 64 reaction thereto is the same. The remote indicator pointers 60 will accordingly always be oriented in the stable compass azimuthal bearing position with respect to their associated cards 61. The remote indicator unit 15 is fully energized from the local A. C. source, and does not produce a drag on the main compass units.

Fig. 5 is an elevational view, partly in section, of a physical form which self-orienting indicator 15 may assume. The indicator 15 shown in Fig. 5 incorporates all the components indicated in schematic diagram, Fig. 4. The pointer 60 and card 61 are at the top, and are viewed through transparent pane 95. The stator and rotor coils 63, 64 are arranged with the pointer 60 within a shoulder 96 extending from the indicator housing 97. Shaft 65 projects from rotor 64 into housing 97 and is coupled to reduction gearing 81. Reduction gearing 81 is supported on a shelf 98, and is shown connected to rotor 79 of motor 80. Rotor 79 is of the drag-cup type. Control tubes 85, 86, condenser 94, and the other electrical elements and connections of indicator 15 are also incorporated within the housing 97. The resultant arrangement is compact, light in weight, rugged, and fool-proof. Such self-orienting units may be used to readily provide compass indications and in any number of remote points aboard the aircraft.

Although I have described preferred embodiments for carrying out the principles of my present invention, it is to be understood that modifications thereof may be made by those skilled in the art without departing from the broader spirit and scope of the invention as defined in the appended claims.

I claim:

1. A compass system comprising a gyroscope, a rotor winding coupled to said gyroscope and orientated thereby in correspondence with the directional position thereof, a stator in inductive relation with said rotor winding, a magnetic compass, a second rotor winding coupled to said magnetic compass and orientated thereby in correspondence with the directional position thereof, a second stator in inductive relation with said second rotor winding, said stators being symmetrically interconnected electrically, a source of alternating current in circuit connection with one of said rotor windings, and means responsive to signals received by the other of said rotor windings from its associated stator when the gyroscope and the magnetic compass are out of their predetermined directional alignment for inducing a corrective precessional action on said gyroscope to restore said alignment.

2. A compass system comprising a directional gyroscope, a rotor winding coupled to said directional gyroscope and orientated thereby in correspondence with the directional position thereof, a multi-phase wound stator inductively related to said rotor winding, a magnetic compass, a second rotor winding coupled to said magnetic compass and orientated in correspondence with the directional position thereof, a second multi-phase wound stator inductively related to said second rotor winding, said stators being symmetrically interconnected electrically, a source of single phase alternating current in circuit connection with one of said rotor windings, and electronic means responsive to alternating current signals impressed upon the other of said rotor windings by its associated stator when the directional gyroscope and the magnetic compass are out of their predetermined directional alignment for inducing a corrective precessional action on said directional gyroscope to restore said alignment.

3. A compass system comprising a directional gyroscope, a first rotor winding coupled to said directional gyroscope and orientated thereby in correspondence with the directional position thereof, a first stator in inductive relation with said first rotor winding, a magnetic compass, a second rotor winding coupled to said magnetic compass and orientated thereby in correspondence with the directional position thereof, a second stator in inductive relation with said second rotor winding, said stators being symmetrically interconnected electrically, a source of alternating current in circuit connection with said first rotor winding, and means responsive to the alternating current signals received by said second rotor winding from said second stator when the directional gyroscope and the magnetic compass are out of their predetermined directional alignment for restoring said alignment.

4. A compass system comprising a gyroscope, a first rotor winding coupled to said gyroscope and orientated thereby in correspondence with the directional position thereof, a first multi-phase wound stator inductively related to said first rotor winding, a magnetic compass, a second rotor winding magnetically coupled to said magnetic compass and orientated thereby in correspondence with the directional position thereof, a second multi-phase wound stator inductively related to said second rotor winding, said stators being symmetrically interconnected electrically, a source of single phase alternating current in circuit connection with said first rotor winding, and electronic means responsive to the alternating current signals impressed upon said second rotor winding by said second stator when the gyroscope and the magnetic compass are out of their predetermined directional alignment for inducing a corrective precessional action on said gyroscope to restore said alignment.

5. A compass system comprising a directional gyroscope, a first rotor winding coupled to said directional gyroscope and orientated thereby in correspondence with the directional position thereof, a first stator inductively related to said first rotor winding, a magnetic compass, a second rotor winding coupled to said magnetic compass and orientated thereby in correspondence with the directional position thereof, a second stator inductively related to said second rotor winding, said stators being interconnected electrically, a source of single phase alternating current in circuit connection with said first rotor winding, means for altering the directional orientation of said gyroscope including a magnet bar secured to the horizontal gimbal ring of the gyroscope and a coil adjacent said ring, and means responsive to signals received by said second rotor winding when the directional gyroscope and the magnetic compass are out of their predetermined directional alignment for inducing a corrective precessional action on said directional gyroscope comprising an electronic amplifier connected to said coil for creating a uni-directional magnetic flux about said magnet bar.

6. A compass system comprising a gyroscope, a first rotor winding coupled to said gyroscope and orientated thereby in correspondence with the directional position thereof, a first multi-phase wound stator in inductive relation with said first rotor winding, a magnetic compass, a second rotor winding magnetically coupled to said magnetic compass and orientated thereby in correspondence with the directional position thereof, a second multi-phase wound stator in inductive relation with said second rotor winding, said stators being symmetrically interconnected electrically, a source of alternating current in circuit connection with said first rotor winding, means for inducing a corrective precessional action on said gyroscope including a permanent magnet bar secured to the horizontal gimbal ring of the gyroscope and a coil adjacent said ring, and means responsive to signals received by said second rotor winding from said second stator when the gyroscope and the magnetic compass are out of their predetermined directional alignment for restoring said alignment comprising an electronic amplifier and a pair of electronic paths responsive to said amplifier and connected to said coil for creating a unidirectional magnetic flux about said magnet bar in the proper sense to effect the restoration.

7. A compass system comprising a directional gyroscope, a first rotor winding coupled to said directional gyroscope and orientated thereby in correspondence with the directional position thereof, a first stator in inductive relation with said first rotor winding, a magnetic compass, a second rotor winding coupled to said magnetic compass and orientated thereby in correspondence with the directional position thereof, a second stator in inductive relation with said second rotor winding, said stators being interconnected electrically, a source of single phase alternating current connected to one of said rotor windings, means for altering the directional orientation of said gyroscope including a magnet bar secured to the horizontal gimbal ring of the gyroscope and a coil adjacent said ring, means responsive to alternating current signals received by the other of said rotor windings from its associated stator when the directional gyroscope and the magnetic compass are out of their predetermined directional alignment for restoring said alignment comprising an electronic amplifier connected to said coil for creating a unidirectional magnetic flux about said magnet bar in the proper sense to effect the restoration, and an element for adjusting the relative strengths of said magnetic flux.

8. A compass system comprising a gyroscope, a rotor winding coupled to said gyroscope and orientated thereby in correspondence with the directional position thereof, a stator in inductive relation with said rotor winding, a magnetic compass, a second rotor winding coupled to said magnetic compass and orientated thereby in correspondence with the directional position thereof, a second stator in inductive relation with said second rotor winding, said stators being symmetrically interconnected electrically, a source of alternating current in circuit connection with one of said rotor windings, and means connected with said alternating current source and responsive to signals received by the other of said rotor windings from its associated stator when the gyroscope and the magnetic compass are out of their predetermined directional alignment for inducing a corrective precessional action on said gyroscope to restore said alignment.

9. A compass system comprising a gyroscope, a first rotor winding coupled to said gyroscope and orientated thereby in correspondence with the directional position thereof, a first multi-phase wound stator inductively related to said first rotor winding, a magnetic compass, a second rotor, winding magnetically coupled to said magnetic compass and orientated thereby in correspondence with the directional position thereof, a second multi-phase wound stator inductively related to said second rotor winding, said stators being symmetrically interconnected electrically, a source of single phase alternating current in circuit connection with said first rotor winding, and electronic means connected with said alternating current source and responsive to the alternating current signals impressed upon said second rotor winding by said second stator when the gyroscope and the magnetic compass are out of their predetermined directional alignment for inducing a corrective precessional action on said gyroscope to restore said alignment.

10. A compass system comprising a directional gyroscope, a first rotor winding coupled to said directional gyroscope and orientated thereby in correspondence with the directional position thereof, a first stator in inductive relation with said first rotor winding, a magnetic compass, a second rotor winding coupled to said magnetic compass and orientated thereby in correspondence with the directional position thereof, a second stator in inductive relation with said second rotor winding, said stators being symmetrically interconnected electrically, a source of alternating current in circuit connection with said first rotor winding, and means including a dynamometer relay connected to said alternating current source and responsive to the alternating current signals received from said second rotor winding from said second stator when the directional gyroscope and the magnetic compass are out of their predetermined directional alignment for restoring said alignment.

11. A compass system comprising a gyroscope, a first rotor winding coupled to said gyroscope and orientated thereby in correspondence with the directional position thereof, a first multi-phase wound stator in inductive relation with said first rotor winding, a magnetic compass, a second rotor winding magnetically coupled to said magnetic compass and orientated thereby in correspondence with the directional position thereof, a second multi-phase wound stator in inductive relation with said second rotor winding, said stators being symmetrically interconnected electrically, a source of alternating current in circuit connection with said first rotor winding, means for inducing a corrective precessional action on said gyroscope including a permanent magnet bar secured to the horizontal gimbal ring of the gyroscope and a coil adjacent said ring, and means responsive to signals received by said second rotor winding from said second stator when the gyroscope and the magnetic compass are out of their predetermined directional alignment for restoring said alignment comprising a dynamometer relay in circuit with said second rotor winding and connected to said alternating current source, and a unidirectional current source in circuit connection with said coil and the contacts of said relay whereby a uni-directional magnetic flux is selectively created about said magnet bar in the proper sense to effect the restoration.

12. A compass system comprising a gyroscope; a first pick-off unit having a rotor coupled to said gyroscope and oriented thereby in correspondence with the directional position thereof; a magnetic compass; a second pick-off unit having a rotor coupled to said magnetic compass and oriented thereby in correspondence with the directional position thereof; a remote indicator having a rotatable index; a third pick-off unit having a rotor coupled to said rotatable index and oriented thereby in correspondence with the directional position thereof; circuit means electrically interconnecting said pick-off units; means responsive to signals received by said second pick-off unit from said first pick-off unit when the gyroscope and the magnetic compass are out of their predetermined directional alignment for inducing a corrective precessional action on said gyroscope to restore said alignment; a motor geared to said rotatable index; and means responsive to signals received by said third pick-off unit from said first pick-off unit when the gyroscope and the rotatable index are out of their predetermined directional alignment for energizing said motor to restore said alignment of said gyroscope and said rotatable index.

WILLIAM P. LEAR.